Sept. 8, 1970   J. JANETKA   3,527,361
LOCKING JOINT STRUCTURES FOR GARMENT RACKS
Filed Oct. 3, 1968
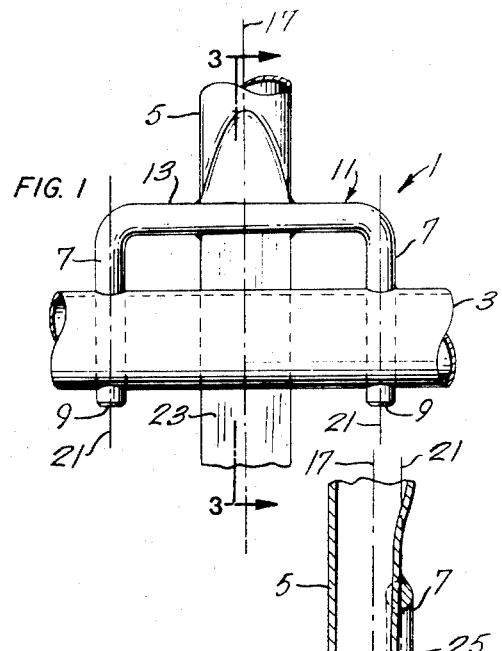
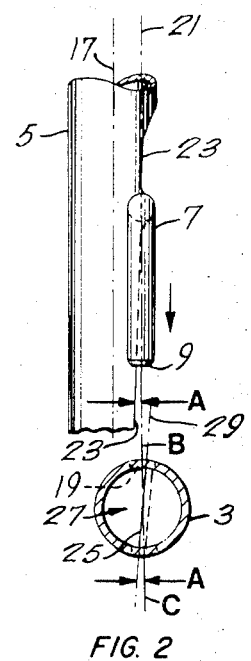
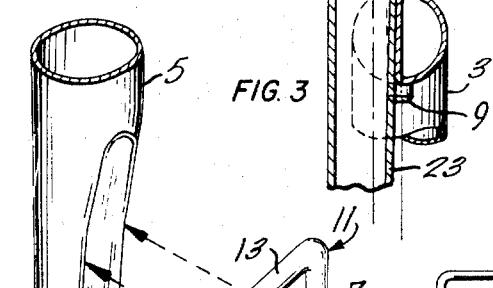
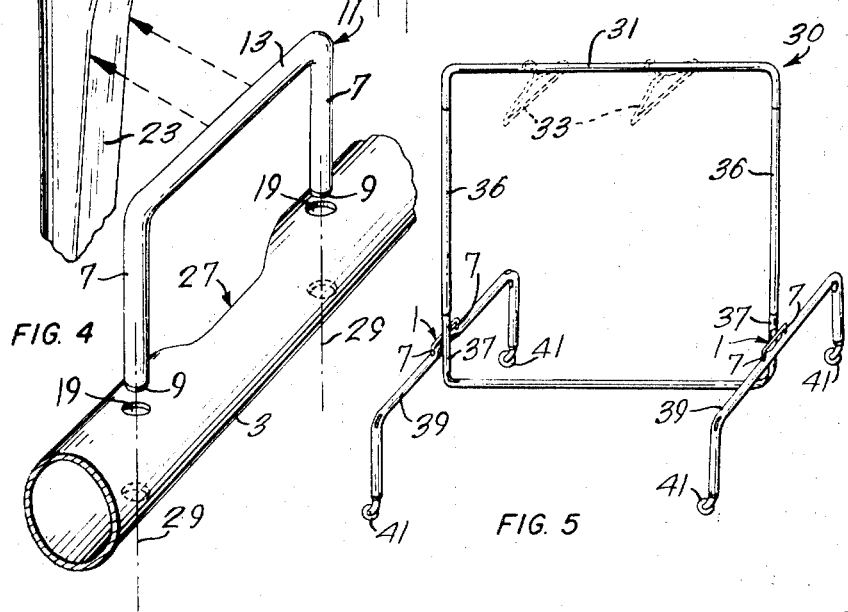
INVENTOR
John JANETKA
ATTORNEY

United States Patent Office 3,527,361
Patented Sept. 8, 1970

3,527,361
LOCKING JOINT STRUCTURES FOR GARMENT RACKS
John Janetka, Ville d'Anjou, Quebec, Canada, assignor to New York Wire Works Limited, Montreal, Quebec, Canada
Filed Oct. 3, 1968, Ser. No. 764,790
Claims priority, application Canada, Sept. 9, 1968, 029,582
Int. Cl. A47f 5/14
U.S. Cl. 211—182      7 Claims

ABSTRACT OF THE DISCLOSURE

A releasable locking means for detachably connecting two tubular members together transversely to one another. The locking means comprises guide rods on one member received in guide holes in the other member for guiding the other member transversely with respect to one member to a locking position. Cooperating cam surfaces are provided on both members to wedge the members together as they are relatively moved to a locking position.

---

This invention relates to an improved releasable locking means for connecting two tubular members together transversely to one another.

More particularly, the invention relates to a releasable locking means for connecting two pipes together transversely to one another by a wedging action whereby the pipe members will be firmly held together under normal use and not easily separated and yet, if desired, can be separated by a sharp blow applied in a predetermined unlocking direction.

The releasable locking means is particularly suitable for use in "knockdown" garment racks. Such garment racks generally comprise an inverted U-shaped frame with transverse legs releasably attached at the bottom ends of the arms of the frame to vertically support the frame. Wheels on the legs allow the rack to be easily moved while carrying clothes suspended from hangers hooked on the frame. The legs must be easily detached from the frame to "knockdown" the racks to save space when not in use and also easily attached to the frame when the rack is to be used. A known connecting means, using keyhole slots and cooperating prongs, is shown in U.S. Pat. 3,071,400, issued Jan. 1, 1963, Jack Bellock, inventor. While the racks, using connecting means as shown in the patent, provide easy attachment and detachment of the legs, the racks are, during normal use, moved over obstructions such as rugs, tracks, stairs, etc. The obstructions can cause the legs to be jogged vertically with respect to the frame and in some cases become detached from the frame through accidental unlocking of the keyhole connecting means.

The present invention is provided to overcome the possibility of accidentally detaching the legs from the frame of a garment rack during its movement by providing an improved means for locking tubular members together transversely to one another to provide substantially positive locking under normal usage preventing their accidental separation and yet allowing them to be easily separated when required.

The present invention more broadly provides an improved releasable locking means for connecting tubular members together transversely to one another which can be used in applications other than for a garment rack. The improved releasable locking means is compact permitting the tubular members to be located closely adjacent each other thus conserving space and sturdily constructed to minimize the possibility of deforming the locking means during use.

The invention resides in providing a releasable locking means for connecting two tubular members together which includes cooperating guide means on both members for guiding one tubular member for transverse movement with respect to the other member in one direction toward a locking position. A cam surface is provided on at least one of said members adjacent the guide means on that member with the cam surface extending at an angle to said one direction of movement whereby relative movement of said members on said guide means toward the locking position causes said cam surface to contact the other member and wedge the members together in a locked position.

The invention will now be described in detail showing a preferred embodiment of the invention and having reference to the drawings wherein:

FIG. 1 is a side elevation view showing the releasable locking means in detail with the tubular members in locked position;

FIG. 2 is a front elevation view showing the releasable locking means in detail with the tubular members in unlocked position;

FIG. 3 is a cross-sectional view along line 3—3 in FIG. 1;

FIG. 4 is a schematic exploded view of the tubular members and guide means; and

FIG. 5 is a schematic view of a clothes rack incorporating the improved releasable locking means.

FIGS. 1, 2, 3 and 4 show the releasable locking means 1 connecting first and second members 3 and 5 together transversely to one another.

The releasable locking means includes cooperating guide means on both members. The guide means guides the movement of the member 3 transversely relative to member 5 toward a locking position. As shown, the cooperating guide means preferably include a pair of outer spaced-apart guide rods 7 attached to the vertical member 5. The guide rods 7 extend downwardly terminating in free ends 9. The guide rods 7 can be formed from a single member 11 of rod material bent in a U-shape with the arms of the U-shaped member forming the guide rods 7 and the horizontal base 13 of the member attached to the member 5. The member 11 can be welded or brazed centrally with respect to member 5. Preferably, the guide rods 7 extend downwardly parallel to the axis 17 of the member 5. Cooperating guide means are formed on the transverse member 3 in the form of a pair of spaced-apart holes 19 passing transversely through the member. The rods 7 pass through the holes 19 in member 3 as it is moved transversely upwardly relative to member 5 to a locking position. The rods 7 are sized to pass through the holes 19 with little clearance.

To wedge or lock the members 3 and 5 together, at least one cam surface is provided on either member to force the member 3 in a direction laterally away from the axis 21 of the rods 7 as member 3 moves relative to member 5 on the rods. Preferably, cooperating cam surfaces are provided on both members. As shown in FIGS. 1, 2, 3 and 4, a longitudinally extending cam surface 23 is formed on the vertical member 5 adjacent the guide rods 7. The main portion of the cam surface 23 extends in a direction at a slight angle A to an imaginary plane B containing the axis 21 of the rods 7. Preferably, the angle A is 3° although it can vary from between 2° to 6° or more. A second cam surface 25 is formed on the second transverse member 3 centrally of the holes 19. A transverse notch 27 is formed in the member 3 with the base of the notch forming the second cam surface 25. The second cam surface 25 also preferably extends in a direction at angle A to an imaginary plane C containing the axis 29 of the holes 19.

When the member 3 is moved upwardly relative to member 5 on the guide rods 7, the cooperating cam surfaces 23 and 25, facing and parallel to each other, come into contact. Upon continued movement and since the cam surfaces extend at a slight angle to the direction of movement dictated by the guide means, they tend to cam the member 3 transversely against the holding force of rods 7, thus wedging the member 3 between member 5 and the guide rods 7. The members are locked in position by the frictional forces of the contacting cam surfaces 23, 25. The rod member 11 is of sufficient diameter to resist bending of the guide rods 7 as the cam surfaces 23, 25 contact.

The members 3 and 5 can be easily unlocked by directing a sharp blow to it in a downward direction parallel to the direction of the plane B of the guide rods 7.

Preferably, as shown in FIGS. 1 to 4, both members 5 and 3 are pipes with the cam surfaces 23 and 25 formed by deforming the walls of the pipes in a well-known manner. In actual practice, the cam surfaces 23 and 25 in the pipes may be centrally depressed as a result of the forming operation on the pipe. The holes 19 are formed in the pipe 3 by drilling completely through the cylindrical wall of the pipe. The rods 7 must pass completely through the pipe member 3 to prevent lateral play as pipe member 3 is guided on the rods.

While a preferred embodiment of the invention has been shown, it will be obvious that many modifications thereto may be made. For example, the members 3 and 5, shown as cylindrical pipes, could also be solid rods or bars. Other solid or tubular shapes such as square or elliptical could also be used.

While cooperating cam surfaces have been shown on both members, only one cam surface, preferably located on the vertical member 5, could be used to provide a wedging action for the other member being moved along the guide rods. The frictional forces holding the members together, however, would not be as great as when using two cam surfaces. The guiding means can also take other forms. For example, the guide rods can be attached on the transverse member 3 instead of the vertical member 5 and a plate can be provided on the vertical member 5 with holes in it receiving the guide rods moving relatively upwardly to guide the leg in a direction toward a locking position. Further, the guide rods and holes can extend in a direction at an angle A with respect to the axis of the vertical member 5 with the cam surface or surfaces extending parallel to the axis of the vertical member.

FIG. 5 illustrates a clothes rack 30 incorporating the improved locking means shown in FIGS. 1, 2 and 3. The rack includes an inverted U-shaped upper frame 31 for carrying clothes suspended by hangers 33. A lower U-shaped frame 35 is connected to the upper frame 31 through vertical side sections 36 to form a rectangular shaped frame. The frames 31 and 35 preferably are bent pipe sections and slidably interconnected in a well-known manner to side sections 36 which are also pipe sections. Detachably connected to the upturned vertical arms 37 of the frame 35 are transverse extending legs 39 in the shape of a shallow inverted U. Wheels 41 can be attached to the ends of the arms of the legs. The legs 39 support the connected frames 31 and 35 in a vertical position and the wheels allow it to be wheeled or transported from one position to another.

Each leg 39 is attached to an arm 37 of the frame 35 by the releasable locking means 1 with the guide rods 7 being connected to the arm 37 and the leg 39 having the holes 19 drilled therethrough with the cooperating cam surfaces 23 and 25 formed on arm 37 and leg 39 respectively. The locking means permits the legs to be quickly attached and detached to the frame yet provides positive frictional locking through the cam surfaces to reduce the possibility of the legs becoming accidentally detached. If desired, frame 35 could be dispensed with and each leg 39 could be attached to the lower ends of the vertical sections 36 of the frame by the locking means.

While the invention is specifically directed toward providing an improved locking means for a clothes rack, it will be obvious that the locking means can be used in many other applications where a certain degree of positive locking is required for normal usage yet permitting quick release of the transversely connected together members when required.

I claim:

1. Releasable locking means for connecting first and second tubular members together, comprising: cooperating guide means on both members for guiding the first tubular member for transverse movement with respect to the second member in one planar direction toward a locking position; first and second cooperating cam surfaces formed respectively on said first and second members adjacent said guide means on said members, said cam surfaces extending in a direction at an angle to the plane of movement of said first member; relative movement of said members on said guide means toward said locking position causing said cam surfaces to come into contact and upon continued relative movement to wedge the members together in a locking position, said cooperating guide means comprise spaced-apart guide rods attached to said second member and holes extending transversely through the first member for receiving the guide rods to guide the first member with respect to the second member.

2. Releasable locking means as claimed in claim 1 wherein said guide rods extend parallel to the longitudinal axis of the second member.

3. Releasable locking means as claimed in claim 2 wherein said second cam surface extends longitudinally of the second member and in a direction at an angle to an imaginary plane containing the axis of the guide rods, and said first cam surface is centrally located between the holes and extends in a direction at an angle to an imaginary plane containing the axis of the holes.

4. Releasable locking means as claimed in claim 3 wherein the angle between both cam surfaces and the planes containing the axis of the rods and openings ranges between 2° to 6°.

5. A releasable locking means for connecting first and second pipes together transversely, comprising: a pair of outer guide rods attached to the first pipe, said rods spaced from the pipe and extending in substantially the same direction as the axis of the pipe member; a pair of openings in the second pipe, the guide rods passing through the second pipe through the openings to guide the second pipe for movement transversely to the first pipe to a locking position; a first cam surface formed on the first pipe adjacent the rods and extending longitudinally of the pipe, the first cam surface extending at an angle to an imaginary plane containing the axis of the rods, a second cam surface formed on the second pipe between the pair of openings, the second surface extending at an angle to an imaginary plane containing the axis of the openings, said first and second cam surfaces facing each other and parallel to each other as the second pipe is guided on the rods to a locking position, said cam surfaces contacting one another upon continued movement of said second pipe to wedge said second pipe between said first pipe and the guide rods in a locked position.

6. A releasable locking means as claimed in claim 5 wherein the angle of the first and second cam surfaces with respect to the imaginary planes containing the axis of the rods and the axis of the openings ranges between 2° to 6°.

7. A clothes rack comprising a first inverted U-shaped frame, a second U-shaped frame, the arms of the first and second frames slidably interconnected to form a rectangular shape, a transverse leg attached to each vertical arm of the second frame for supporting both frames in a vertical position, the frames and legs being formed from tubular members, releasable locking means for connecting each leg to the second frame, said releasable locking means comprising cooperating guide means on the leg and the arm of the second frame for guiding the leg for vertical transverse movement with respect to the arm to a locking position, said cooperating guide means comprising spaced-apart guide rods attached to said arm and holes extending transversely through the leg for receiving the guide rods to guide the leg with respect to the arm, cooperating cam surfaces formed on the leg and the arm of the second frame adjacent said guide means, said cam surfaces extending at an angle to the vertical axis of the arm of the second frame whereby the movement of the leg along the guide means in an upward direction causes said cam surfaces to come in contact and upon continued upward movement to wedge the leg between said guide means and the arm of the second frame to lock the leg in position.

References Cited

UNITED STATES PATENTS

| | | | |
|---|---|---|---|
| 1,096,073 | 5/1914 | Taylor | 287—56 |
| 2,896,789 | 7/1959 | Sans et al. | 211—182 X |
| 3,395,811 | 8/1968 | Bellock | 211—182 X |

FOREIGN PATENTS

| | | |
|---|---|---|
| 1,005,229 | 9/1965 | Great Britain. |

DAVID J. WILLIAMOWSKY, Primary Examiner

A. V. KUNDRAT, Assistant Examiner

U.S. Cl. X.R.

287—51